(12) United States Patent
Gemma et al.

(10) Patent No.: US 9,033,388 B2
(45) Date of Patent: May 19, 2015

(54) PILLAR TRIM STRUCTURE

(71) Applicant: Suzuki Motor Corporation, Shizuoka (JP)

(72) Inventors: Kenta Gemma, Shizuoka (JP); Shinichiro Matsumoto, Shizuoka (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 0 days.

(21) Appl. No.: 13/901,896

(22) Filed: May 24, 2013

(65) Prior Publication Data

US 2013/0313848 A1 Nov. 28, 2013

(30) Foreign Application Priority Data

May 25, 2012 (JP) ................... 2012-119135

(51) Int. Cl.
*B60R 13/02* (2006.01)
*B60R 22/20* (2006.01)

(52) U.S. Cl.
CPC ............ *B60R 13/025* (2013.01); *B60R 22/201* (2013.01); *B60R 2013/0281* (2013.01); *B60R 2013/0287* (2013.01)

(58) Field of Classification Search
CPC ............... B60R 22/201; B60R 13/025; B60R 2013/0281; B60R 2013/0287

USPC .............. 296/187.05, 1.08, 193.06, 39.1
See application file for complete search history.

(56) References Cited

U.S. PATENT DOCUMENTS 5,622,086 A * 4/1997 Suzuki et al. ................. 74/566
2008/0296928 A1* 12/2008 Matsuoka et al. ......... 296/146.7

FOREIGN PATENT DOCUMENTS

JP 2-45865 3/1990
JP 4-127047 11/1992

* cited by examiner

*Primary Examiner* — Glenn Dayoan
*Assistant Examiner* — Melissa A Black
(74) *Attorney, Agent, or Firm* — Stein IP, LLC

(57) ABSTRACT

There is provided a pillar trim structure. A plate-shaped slider is configured to slide on a backside of a pillar trim in a longitudinal direction. A tunnel part is provided at an upper end of the backside of the pillar trim and formed with a through-hole. A rib is provided so as to stand at one side of an entrance of the through-hole over the longitudinal direction and inclined so that one edge of the slider gets away from the pillar trim as the slider gets over the rib. The entrance is cut out in an elongated shape at an opposite side and is cut out widely so that the entrance is more inclined with respect to the pillar trim than the slider from a predetermined starting point towards the one side and the entrance abuts on the slider at the starting point.

3 Claims, 5 Drawing Sheets

PILLAR TRIM STRUCTURE

CROSS-REFERENCE TO RELATED APPLICATIONS

This application claims the benefit of Japanese Application No. 2012-119135, filed May 25, 2012, in the Japanese Intellectual Property Office, the disclosure of which is incorporated herein by reference.

BACKGROUND OF THE INVENTION

1. Field of the Invention

The present invention relates to a pillar trim structure that is used for a seat belt adjuster adjusting a height of a shoulder anchor of a vehicle.

2. Description of the Related Art

In recent years, a seat belt adjuster has been popularized which adjusts a height of a shoulder anchor, which supports a seat belt restraining a passenger of a vehicle with a shoulder of the passenger, and thus adjusts a path along which the seat belt extends. As disclosed in Patent Document 1, the seat belt adjuster includes a pillar trim and a slider (slide plate). The slider overlaps with a guide hole from a backside of the pillar trim and slides on the backside of the pillar trim in a longitudinal direction of the pillar trim as the height of the shoulder anchor is adjusted. In the related art, the slider may rattle due to vibrations upon driving and thus collide with an inner surface of the trim, so that an abnormal noise, i.e., rattling noise may be generated.

Patent Document 2 discloses a technology of providing ribs (protrusions for sliding) on a backside of a pillar trim (garnish) and a guide plate facing the backside and pressing a slider (slide plate) towards the other side by the ribs so as to obtain an appropriate sliding resistance. According to the technology of Patent Document 2, since the slider is pressed towards the other side by the ribs, it is possible to suppress the rattling of the slider.

In the meantime, a pillar trim has been also popularized in which the slider having slid upwards goes into a through-hole formed at a massive tunnel part.

Patent Document 1: Japanese Utility Model Application Publication No. 4-127047

Patent Document 2: Japanese Utility Model Application Publication No. 2-045865

Like the technology disclosed in Patent Document 2, the configuration of pressing the slider towards the other side by the ribs and thus suppressing the rattling of the slider is effective. However, the other parts such as piping of an air conditioner for a roof may be disposed on the backside of the pillar trim, depending on vehicles. In this case, a layout problem that the ribs cannot be made to be sufficiently high so as to avoid interference between the parts may occur. Thus, since it is not possible to sufficiently press the slider towards the other side by the ribs, the slider rattles due to the vibrations upon the driving and thus collides with the inner surface of the trim and the like, so that it is not possible to prevent the abnormal noise, i.e., rattling noise from being generated.

SUMMARY OF THE INVENTION

It is therefore an object of the present invention to provide a pillar trim structure capable of suppressing an abnormal noise, i.e., rattling noise from being generated due to rattling of a slider and preventing a layout problem such as interference between parts even when the other parts such as piping of an air conditioner for a roof are disposed on a backside of a pillar trim.

In order to achieve the above object, according to an aspect of the embodiments of the present invention, there is provided a pillar trim structure having a pillar trim that covers a pillar of a vehicle. The pillar trim structure includes a plate-shaped slider configured to slide on a backside of the pillar trim in a longitudinal direction of the pillar trim; a tunnel part provided at an upper end of the backside of the pillar trim and formed with a through-hole into which the slider slides and goes; and a rib provided so as to stand at one side of an entrance of the through-hole over the longitudinal direction of the pillar trim and inclined so that one edge of the slider gets away from the pillar trim as the slider having gone into the through-hole gets over the rib. The entrance of the through-hole is cut out in an elongated shape at an opposite side to the one side and is cut out widely so that the entrance of the through-hole is more inclined with respect to the pillar trim than the slider from a predetermined starting point towards the one side and the entrance of the through-hole abuts on the slider having gone into the through-hole at the starting point.

According to the above configuration, the entrance of the through-hole of the tunnel part is cut out widely so that it is more inclined with respect to the pillar trim than the slider, from the predetermined starting point towards the one side at which the rib is provided. Therefore, even the slider that gets over the rib and is thus inclined can go into the entrance of the through-hole without any problem.

When the slider goes into the entrance of the through-hole, a lower side of the slider is supported and is thus inclined with the rib and an upper side of the slider is put into with abutting on the predetermined starting point. Thereby, it is possible to suppress the rattling of the slider and to thus prevent the rattling noise from being generated.

In the meantime, since the entrance of the through-hole is cut out in an elongated shape up to the predetermined starting point, it is not necessary to increase a volume of the tunnel part within the corresponding range. The volume of the tunnel part may be increased in a minimum necessary range of the entrance of the through-hole, within which the entrance is cut out widely after the starting point. Therefore, when the side at which the entrance is cut out in the elongated shape is configured as a side to which the other parts are adjacent, even though the rib is made to be sufficiently high at the entrance of the through-hole and the abnormal noise is thus prevented from being generated, a layout problem that the tunnel part interferes with the other parts is not caused.

The starting point may be positioned at a center of the entrance of the through-hole or positioned at the opposite side to the one side with respect to the center. Thereby, since an interval between the rib and the predetermined starting point, into which the upper side of the slider is put, is secured, it is possible to suppress the rattling of the slider more positively.

The slider may have a shape configured to go into the entrance of the through-hole from an edge of the one side. Thereby, it is possible to enable the slider to smoothly go into the entrance of the through-hole. Since the structure that the slider getting over the rib is held between the rib and the predetermined starting point is provided, the slider may collide with the entrance of the through-hole unless the slider goes into the entrance from the side at which the entrance of the through-hole is widely cut out.

According to the present invention, it is possible to provide a pillar trim structure capable of suppressing an abnormal noise, i.e., rattling noise from being generated due to rattling of a slider and preventing a layout problem such as interference of parts even when the other parts such as piping of an air conditioner for a roof are disposed on a backside of the pillar trim.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

In the accompanying drawings.

DETAILED DESCRIPTION OF THE EMBODIMENTS

Figure 1:
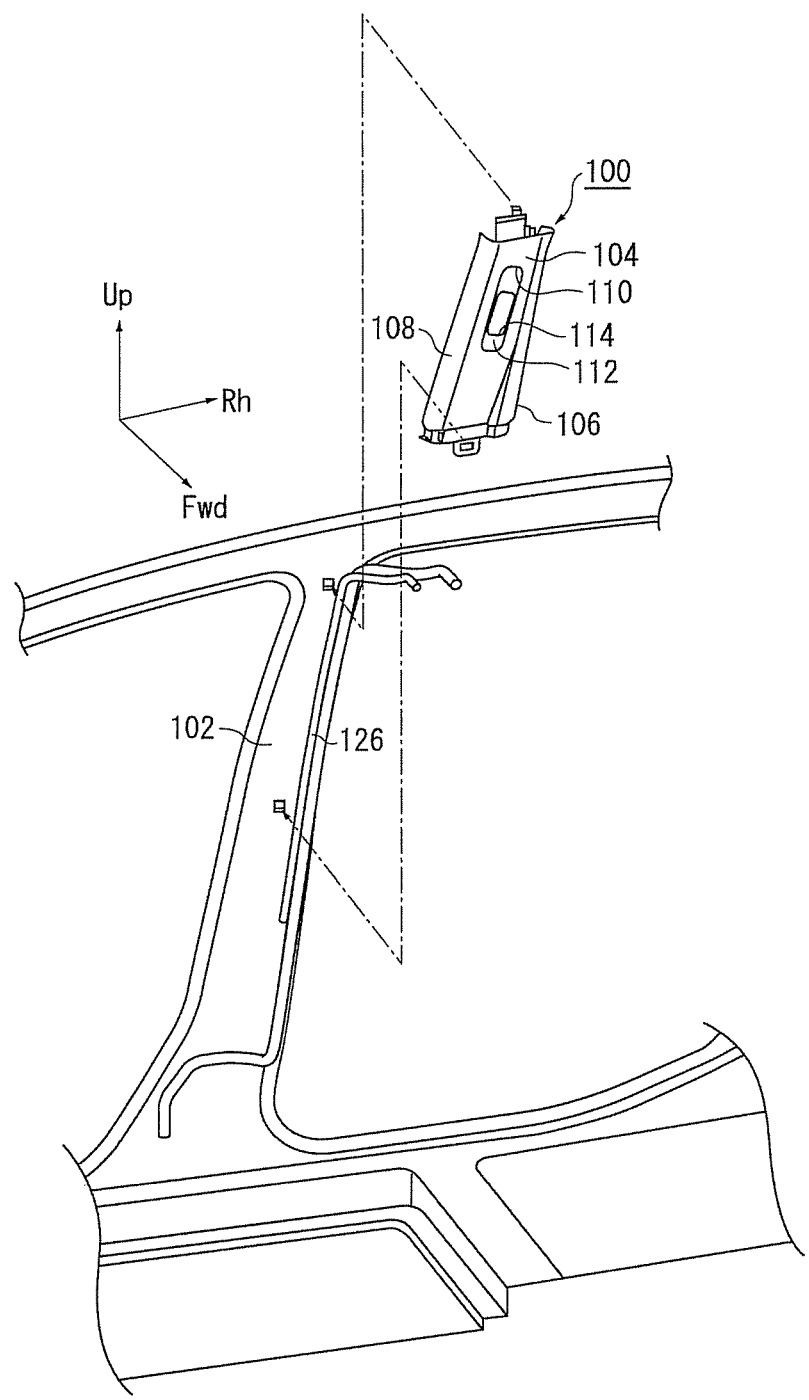
FIG. 1 shows an illustrative embodiment of a pillar trim structure of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a preferred illustrative embodiment of the present invention will be specifically described with reference to the accompanying drawings. The sizes, materials, other specific numerical values and the like described in the illustrative embodiment are just exemplary so as to easily understand the present invention and do not limit the present invention unless otherwise mentioned. Also, in the specification and the drawings, the constitutional elements having the substantially same functions and configurations are indicated with the same reference numerals and the overlapping descriptions thereof are omitted. Also, the constitutional elements that are not directly related to the present invention are not shown. Meanwhile, in this illustrative embodiment, the front, rear, left, right, upper and lower are described on the basis of a pillar trim. In all the drawings, the 'front' is indicated with an arrow Fwd, the 'right' is indicated with an arrow Rh and the upper is indicated with an arrow Up.

FIG. 1 shows an illustrative embodiment of a pillar trim structure of the present invention. As shown in FIG. 1, a pillar trim 100 according to the pillar trim structure of the present invention covers an upper part of a center pillar 102 of a vehicle. The pillar trim 100 has a front surface 104 and right and left side surfaces 106, 108 continuing from the front surface 104 and forms a shape that is long in the upper-lower direction. The front surface 104 of the pillar trim 100 is formed with a guide hole 110 that is through-hole formed in a longitudinal direction of the pillar trim. A backside of the front surface 104 is provided with a slider 112 that overlaps with the guide hole 110 and slides in the longitudinal direction of the pillar trim 100.

Figure 2:
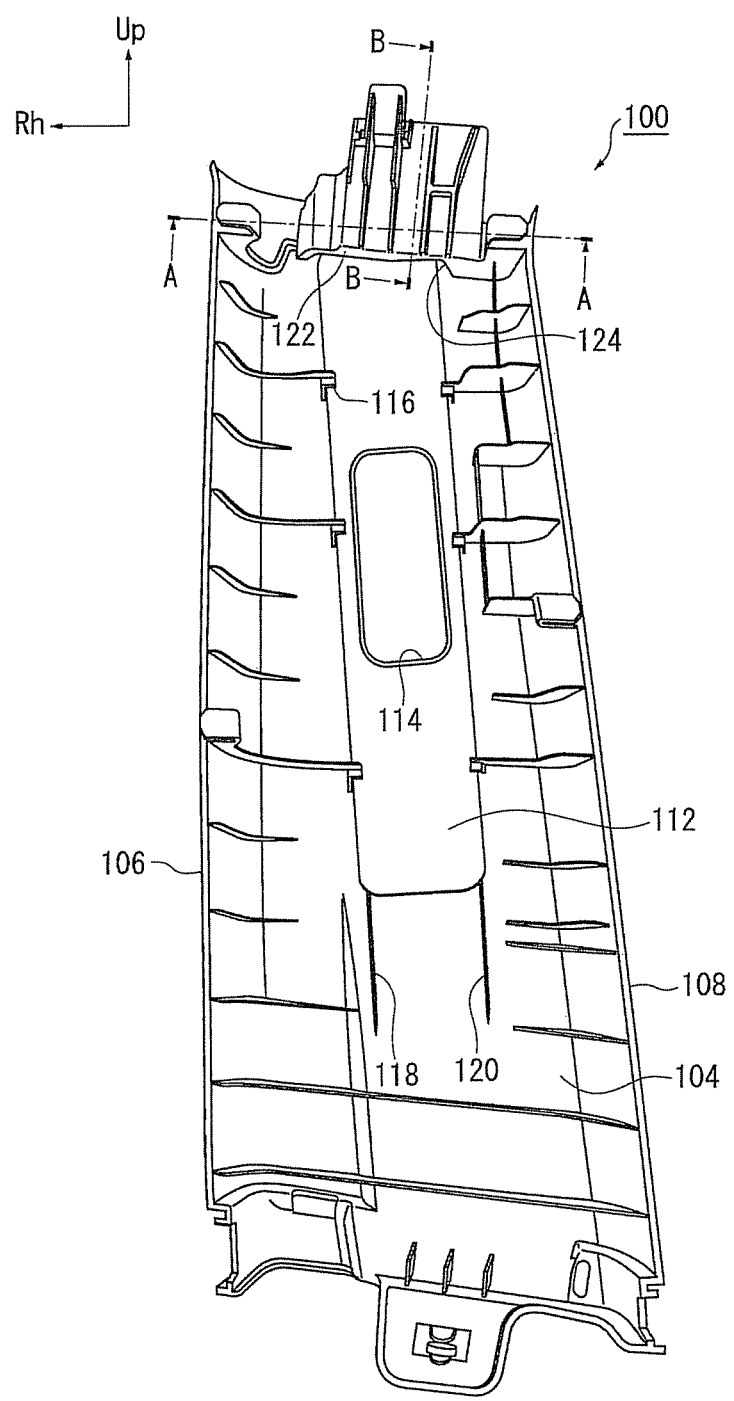
FIG. 2 shows a backside of the pillar trim of FIG. 1.

FIG. 2 shows the backside of the pillar trim 100. As shown in FIG. 2, the slider 112 is a plate-shaped part that is long in the upper-lower direction and is made of plastic resin and the like. Therefore, the slider 112 can be bent somewhat. The slider 112 is integrated with a shoulder anchor through an opening 114 that is penetrated in the longitudinal direction thereof and covers the guide hole 110 so that mechanism parts (for example, a height adjusting part of the shoulder anchor) in the pillar trim 100 cannot be seen from the guide hole 110.

Figure 3:
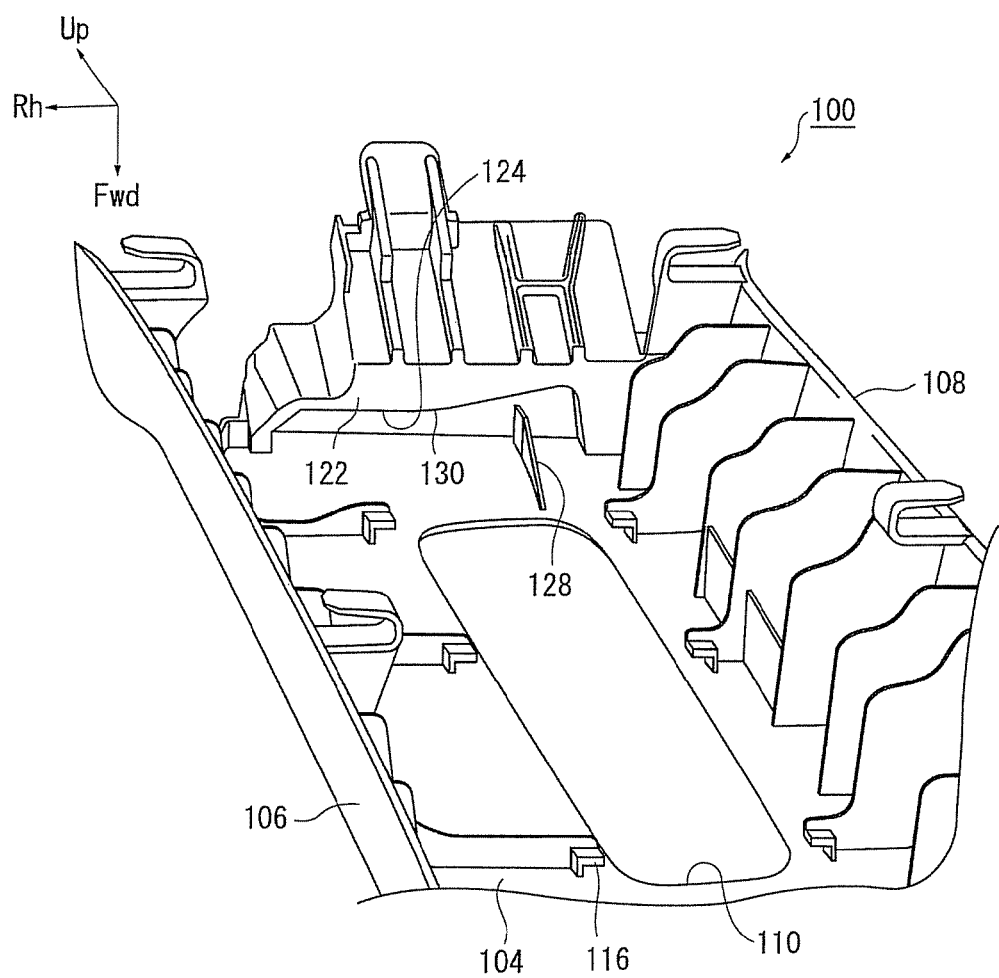
FIG. 3 is a perspective view showing an upper part of the backside of the pillar trim of the FIG. 2.

FIG. 3 is a perspective view showing an upper part of the backside of the pillar trim 100. Meanwhile, FIG. 3 shows a state where the slider 112 has been detached. As shown in FIG. 3, the backside of the front surface 104 of the pillar trim 100 is provided thereon with slider holding parts 116 (only one of them is representatively indicated with a reference numeral) having a substantial 'L' shape that slidably hold both left and right sides of the slider 112 between the slider holding parts and the backside of the front surface 104. Here, the three slider holding parts 116 are provided at each of both left and right sides with the guide hole 110 being interposed therebetween.

As shown in FIG. 2, the pillar trim 100 is provided with two standing ribs 118, 120 from a lower side of the guide hole 110 of the backside of the front surface 104 over the longitudinal direction of the pillar trim 100. The slider 112 that slides downwards gets over the ribs 118, 120 and is pressed to the slider holding parts 116. Thereby, it is possible to suppress the slider 112 from rattling while providing the slider 112 with an appropriate sliding resistance.

Figure 4A:
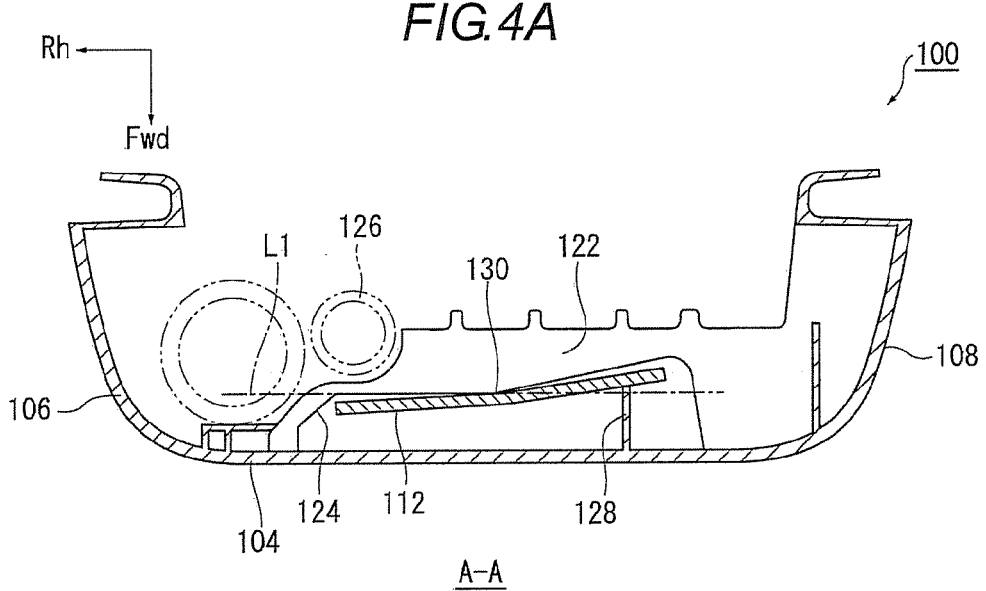
FIG. 4A is a sectional view taken along a line A-A of FIG. 2.
Figure 4B:
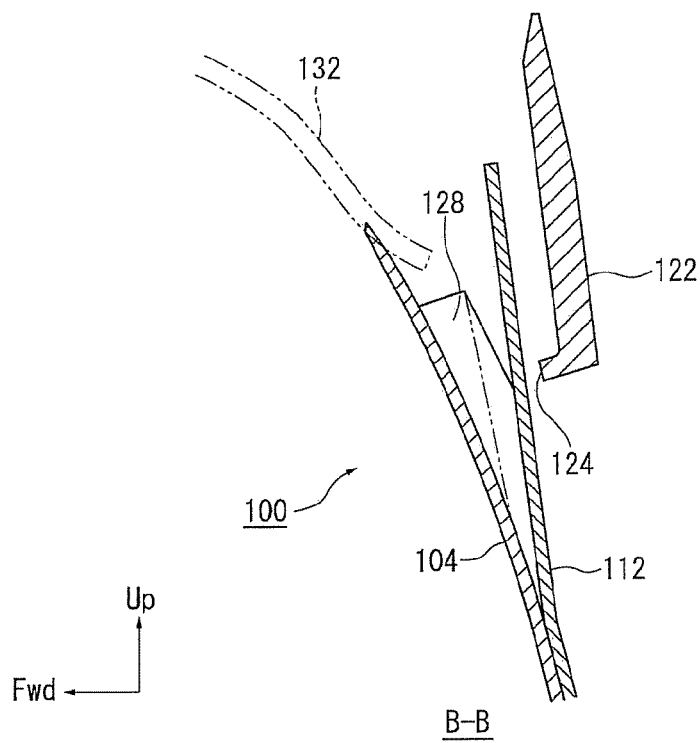
FIG. 4B is a sectional view taken along a line B-B of FIG. 2.

FIGS. 4A and 4B are sectional views of FIG. 2, in which FIG. 4A is a sectional view taken along a line A-A of FIG. 2 and FIG. 4B is a sectional view taken along a line B-B of FIG. 2. As shown in FIG. 4A, the backside of the front surface 104 of the pillar trim 100 is provided at its upper end with a tunnel part 122. The tunnel part 122 is formed with a through-hole 124 into which the slider 112 having slid upwards can go. By the tunnel part 122, an interference between the slider 112 going into the through-hole 124 and a piping 126 (which is shown with a virtual line) of an air conditioner for a roof positioned at an outer and right side of the tunnel part 122 is prevented.

The pillar trim 100 is provided with a rib 128 at one side (here, at the left side) of the entrance of the through-hole 124 over the longitudinal direction of the pillar trim 100. The slider 112 sliding upwards gets over the rib 128 at the entrance of the through-hole 124 and the rib 128 is inclined so that an edge of one side (left side) of the slider 112 gets away from the backside of the front surface 104. The rib 128 is made to be sufficiently high, so that it is possible to strongly press the slider 112 towards the slider holding parts 116. Thereby, it is possible to suppress the rattling of the slider 112 at the upper side.

However, the piping 126 of the air conditioner for a roof is positioned at the outer and right side of the tunnel part 122, so that it is not possible to change a position (which is shown with the 'line L1' in FIG. 4A) of a part of the piping 126-side facing the pillar trim 100. Therefore, it is not possible to simply heighten the rib 128. Hence, in this illustrative embodiment, while the entrance of the through-hole 124 is cut out in an elongated shape at an opposite side (right side) to the one side, and is cut out widely so that the entrance of the through-hole 124 is more inclined with respect to the pillar trim 100 (backside of the front surface 104) than the slider 112 from a predetermined starting point 130 towards the one side (left side).

Thereby, it is possible to provide the rib 128 so as to stand with a sufficient height in a space that is formed by the above wider cutout. Specifically, the rib 128 having a height at which the slider 112 getting thereover becomes higher than the line L1 is set. Thereby, since it is possible to strongly press the slider 112 to the slider holding parts 116, it is possible to suppress the rattling of the slider 112 at the upper side. Also, in this illustrative embodiment, the upper side of the slider 112 getting over the rib 128 is held between the rib 128 and the predetermined starting point 130 (the upper side of the slider 112 abuts on the starting point 130). Also with this configuration, it is possible to suppress the rattling of the slider 112 at the upper side.

The predetermined starting point 130 is set so that it is positioned at a center of the entrance of the through-hole 124 or at an opposite side (right side) to the one side with respect to the center. Here, the predetermined starting point 130 is set at a center of the entrance of the through-hole 124. Thereby, since an interval between the rib 128 and the starting point 130, into which the upper side of the slider 112 is put, is secured, it is possible to reliably suppress the rattling of the slider 112 at the upper side.

As shown in FIG. 4B, the rib 128 guides rearwards the upper side of the pillar trim 100 sliding upwards. Thereby, since it is possible to prevent an interference with a roof lining 132 (which is shown with the virtual line) that is an interior material covering the roof, it is possible to enable the slider 112 to smoothly slide.

Figure 5A:
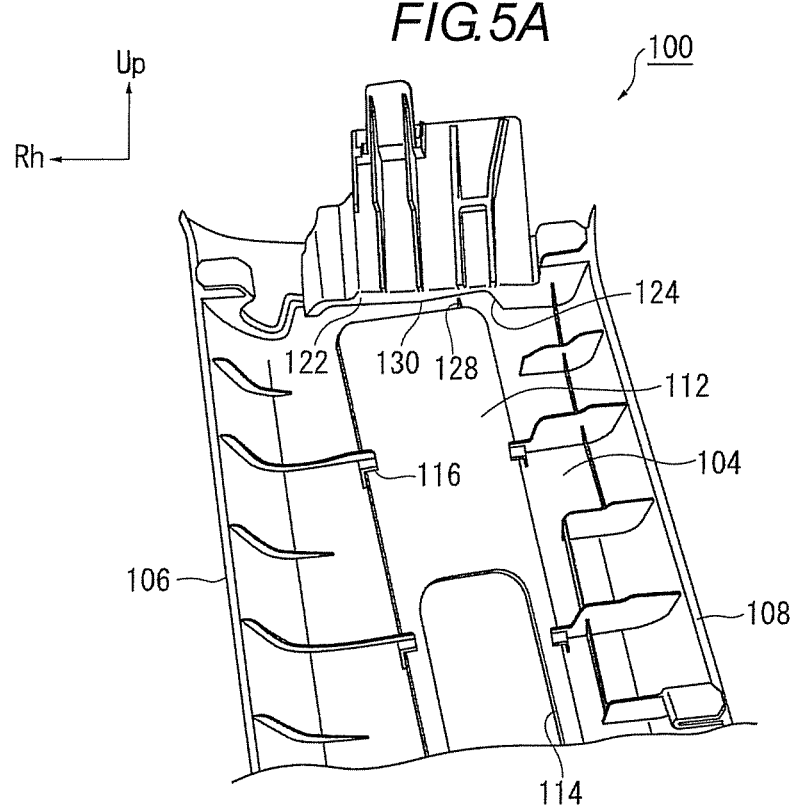
FIGS. 5A and 5B show a state where a slider is going into an entrance of a through-hole of FIG. 3.
Figure 5B:
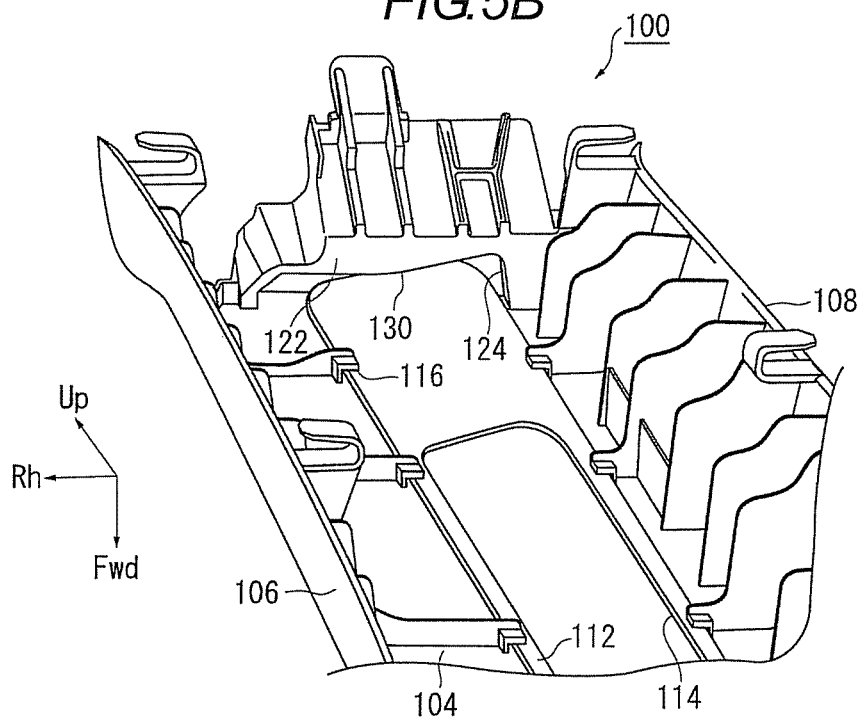

FIGS. 5A and 5B show a state where the slider 112 is going into the entrance of a through-hole 124. FIG. 5A shows a state before the slider 112 goes into the entrance and FIG. 5B shows a state after the slider 112 goes into the entrance. As shown in FIGS. 5A and 5B, the slider 112 has a shape that it goes into the entrance of the through-hole 124 from an edge of the one side (left side) at which the entrance is widely cut out. That is, since the structure where the slider 112 having gone into the entrance is enabled to bend and is thus held between the rib 128 and the predetermined starting point 130 is adopted, the slider may collide with the entrance unless the slider 112 goes into the entrance from the side at which the entrance of the through-hole 124 is widely cut out. Thereby, it is possible to enable the slider 112 to smoothly go into the entrance of the through-hole 124.

According to the pillar trim structure, the rib 128 having the sufficient height is provided, so that the slider 112 having gone into the entrance of the through-hole 124 is pressed to the slider holding parts 116 and the predetermined starting point 130. Thereby, it is possible to suppress the rattling of the slider 112 and to thus prevent the abnormal noise, i.e., rattling noise from being generated while providing the slider with the appropriate sliding resistance. Also, even when the other parts such as piping 126 for an air conditioner of a roof are disposed on the backside of the pillar trim 100, a part capable of securing a space without changing a layout of a side at which the other parts are disposed is widely cut out and the rib 128 is set therein. Therefore, the pillar trim of the present invention can be easily applied even when there is only a marginal space. Since the slider 112 goes into the through-hole 124 from the left side that is widely cut out and does not interfere with the roof lining 132, the smooth sliding operation is secured.

Although the preferred illustrative embodiment of the present invention has been described with reference to the accompanying drawings, the present invention is not limited to the illustrative embodiment. It is obvious to one skilled in the art that a variety of changes or modifications can be made within the scope defined in the claims, which are also included in the technical scope of the invention.

The present invention can be used as a pillar trim structure that is used for a seat belt adjuster adjusting a height of a shoulder anchor of a vehicle.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A pillar trim structure having a pillar trim that covers a pillar of a vehicle, the pillar trim structure comprising:
   a plate-shaped slider configured to slide on a backside of the pillar trim in a longitudinal direction of the pillar trim;
   a tunnel part provided at an upper end of the backside of the pillar trim and formed with a through-hole into which the slider slides and goes; and
   a rib provided so as to stand at one side of an entrance of the through-hole over the longitudinal direction of the pillar trim and inclined so that one edge of the slider gets away from the pillar trim as the slider goes into the through-hole gets over the rib,
   wherein the entrance of the through-hole is cut out in an elongated shape at an opposite side to the one side and is cut out widely so that the entrance of the through-hole is more inclined with respect to the pillar trim than the slider from a predetermined starting point towards the one side and the entrance of the through-hole abuts on the slider at the starting point as the slider goes into the through-hole.

2. The pillar trim structure according to claim 1, wherein the starting point is positioned at a center of the entrance of the through-hole or positioned at the opposite side to the one side with respect to the center.

3. The pillar trim structure according to claim 1, wherein the slider has a shape configured to go into the entrance of the through-hole from an edge of the one side.

\* \* \* \* \*